(12) United States Patent
Kato et al.

(10) Patent No.: US 10,907,816 B2
(45) Date of Patent: Feb. 2, 2021

(54) CONNECTOR, CONNECTOR MOUNTING BOARD, ILLUMINATION DEVICE, AND DISPLAY DEVICE

(71) Applicants: SAKAI DISPLAY PRODUCTS CORPORATION, Sakai (JP); ACES ELECTRONICS CO., LTD, Zhongli (TW)

(72) Inventors: Nobukazu Kato, Fussa (JP); I-chiao Tso, Zhongli (TW); Takahiro Yoshikawa, Fukuyama (JP)

(73) Assignees: SAKAI DISPLAY PRODUCTS CORPORATION, Sakai (JP); ACES ELECTRONICS CO., LTD, Zhongli (TW)

( * ) Notice: Subject to any disclaimer, the term of this patent is extended or adjusted under 35 U.S.C. 154(b) by 662 days.

(21) Appl. No.: 15/737,908

(22) PCT Filed: May 30, 2016

(86) PCT No.: PCT/JP2016/065869
§ 371 (c)(1),
(2) Date: Dec. 19, 2017

(87) PCT Pub. No.: WO2016/208328
PCT Pub. Date: Dec. 29, 2016

(65) Prior Publication Data
US 2018/0231228 A1 Aug. 16, 2018

(30) Foreign Application Priority Data
Jun. 26, 2015 (JP) .................................. 2015-128389

(51) Int. Cl.
*F21V 23/06* (2006.01)
*H01R 12/73* (2011.01)
(Continued)

(52) U.S. Cl.
CPC ................ *F21V 23/06* (2013.01); *F21K 9/20* (2016.08); *F21S 2/00* (2013.01); *F21V 19/0035* (2013.01);
(Continued)

(58) Field of Classification Search
CPC ...... F21K 9/20; F21S 4/00; F21S 4/28; F21V 19/0035; F21V 23/06; F21Y 2115/10;
(Continued)

(56) References Cited

U.S. PATENT DOCUMENTS 7,959,445 B1 * 6/2011 Daily ................... H01R 12/716
439/65
9,453,621 B2 * 9/2016 Ohno .................... F21V 21/005
(Continued)

FOREIGN PATENT DOCUMENTS

CN 1614829 A 5/2005
CN 102292593 A 12/2011
(Continued)

OTHER PUBLICATIONS

International Preliminary Report on Patentability dated Dec. 26, 2017 for International Patent Application No. PCT/JP2016/065869; 9 pages.
(Continued)

*Primary Examiner* — Peggy A Neils
(74) *Attorney, Agent, or Firm* — Chiesa Shahinian & Giantomasi PC

(57) ABSTRACT

A connector comprises a first connector and a second connector to be connected with the first connector. The first connector includes a first housing, a holding portion, and a stopper. The second connector includes a second housing, a held portion, and an engagement portion. At the waiting position, the first connector and the second connector are movable between positions in a wall contact state, at which
(Continued)

the leading end of the second connector is in contact with the wall defining the receiving space of the first connector, and positions in a stopped state, at which the stopper of the first connector and the engagement portion of the second connector are in contact with each other.

14 Claims, 24 Drawing Sheets

(51) Int. Cl.
|  |  |
|---|---|
| *H01R 24/00* | (2011.01) |
| *F21S 2/00* | (2016.01) |
| *F21K 9/20* | (2016.01) |
| *F21V 19/00* | (2006.01) |
| *H01R 13/115* | (2006.01) |
| *H01R 13/05* | (2006.01) |
| *H01R 25/16* | (2006.01) |
| *G02F 1/13357* | (2006.01) |
| *F21Y 115/10* | (2016.01) |

(52) U.S. Cl.
CPC ........... *H01R 12/73* (2013.01); *H01R 12/732* (2013.01); *H01R 24/005* (2013.01); *F21Y 2115/10* (2016.08); *G02F 2001/133612* (2013.01); *H01R 13/055* (2013.01); *H01R 13/115* (2013.01); *H01R 25/162* (2013.01)

(58) Field of Classification Search
CPC ........ G02F 2001/133612; H01R 12/73; H01R 12/732; H01R 13/055; H01R 13/115; H01R 24/005; H01R 25/162; H01R 12/91
See application file for complete search history.

(56) References Cited

U.S. PATENT DOCUMENTS

| | | |
|---|---|---|
| 2010/0055976 A1 | 3/2010 | Ohmori et al. |
| 2011/0059652 A1 | 3/2011 | Hoyack et al. |
| 2011/0255014 A1 | 10/2011 | Cho |
| 2013/0157519 A1 | 6/2013 | Ohkuma |
| 2015/0241035 A1* | 8/2015 | Dankelnnann ......... F21V 23/06 362/219 |

FOREIGN PATENT DOCUMENTS

| | | |
|---|---|---|
| CN | 102788333 A | 11/2012 |
| JP | 06-019162 Y | 5/1994 |
| JP | 2011-243425 A | 1/2011 |
| JP | 2012-049002 A | 3/2012 |

OTHER PUBLICATIONS

First Notification of Examination Opinion dated Dec. 17, 2018, in connection with Chinese Patent Application No. 201680036295.5, 18 pgs.

http://www.chinese.molex.com/molex/products/family?key=fleximate#connector#system&channel=products&chanName=family&pageTitle=Introduction&parentKey=board#to#board#connectors; Oct. 2010.

International Search Report and Written Opinion dated Aug. 23, 2016 in connection with International Patent Application No. PCT/JP2016/065869, 8 pgs.

* cited by examiner

CONNECTOR, CONNECTOR MOUNTING BOARD, ILLUMINATION DEVICE, AND DISPLAY DEVICE

CROSS-REFERENCE TO RELATED APPLICATIONS

This application is a U.S. national phase filing under 35 U.S.C. § 371 of International Application No. PCT/JP2016/065869, filed May 30, 2016, which claims priority to Japanese Patent Application No. 2015-128389, filed Jun. 26, 2015, the disclosures of which are incorporated herein by reference in their entirety.

TECHNICAL FIELD

The present invention relates to a connector, a connector mounting board on which the connector is mounted, an illumination device having the connector mounting board on which LEDs are mounted, and a display device including the illumination device.

BACKGROUND ART

A board for a LED backlight mounting a plug connector on one end and a receptacle connector on the other end is known (Non Patent Literature 1). Such board allows coupling of a plurality of boards in the longitudinal direction of the boards by connecting the plug connector mounted on one of adjacent boards with the receptacle connector mounted on the other of the adjacent boards.

In addition, a hinge type connector allowing two circuit boards to be flexibly positioned is known (Patent Literature 1).

CITATION LIST

Non Patent Literature

Non Patent Literature 1: http://www.chinese.molex.com/molex/products/family?key=fleximate#connector#system&channel=products&chanName=family&pageTitle=Introduction&parentKey=board#to#board#connectors (website of MOLEX)

Patent Literature

Patent Literature 1: JP H6-19162 B

SUMMARY OF INVENTION

Technical Problem

For attaching a board to a back chassis of an LED backlight, the back chassis needs to be attached to the board by inserting a protrusion for positioning formed on the back chassis into a through-hole formed in the board.

Since, however, the connectors mounted on the boards disclosed in Non Patent Literature 1 allow connections only in a direction parallel to the longitudinal direction of the boards, such procedures as follows need to be taken for attaching the boards disclosed in Non Patent Literature 1 to a back chassis.

First, as illustrated in FIG. 24, a board 72 to be newly attached is once bent so that the board 72 would not touch a positioning protrusion 74 formed on the back chassis, and a connector 86 mounted on the board 72 to be newly attached is made to face a connector 84 mounted on a board 82 already attached to the back chassis. Subsequently, the position of a through-hole 75 and the position of the positioning protrusion 74 are aligned, and the bent board 72 is returned to its original shape, so that the positioning protrusion 74 is inserted into the through-hole 75. Furthermore, the board 72 is moved in the longitudinal direction of the board with the positioning protrusion 74 inserted in the through-hole 75, and the connector 84 mounted on the board 82 already attached to the back chassis and the connector 86 mounted on board 72 are connected with each other, so that the board 82 and the board 72 are coupled to each other.

In a case where the connectors mounted on the boards disclosed in Non Patent Literature 1 are used as described above, the boards need to be bent in the process of manufacture of the LED backlight, which poses a problem in easily coupling the boards.

Note that the connectors disclosed in Patent Literature 1 are characterized in moving the rotation center of the movement of a hinge of connected connectors within a predetermined range to make the movement eccentric, and are not assumed to be used in manufacture of LED backlights.

An object of the present invention is to provide a connector capable of facilitating connection of boards in the process of manufacture of an LED backlight, and a connector mounting board.

Solution to Problem

A connector according to the present invention includes: a first connector, and a second connector to be connected with the first connector, wherein the first connector includes: a first housing having a receiving space defined by both sidewalls, a base, and a wall facing a leading end of the second connector, the receiving space receiving the second connector to be fitted to the first connector from above the base; a holding portion holding the second connector placed above at a waiting position to wait for being fitted to the first connector; and a stopper preventing the second connector from being detached from the first connector in a longitudinal direction of the both sidewalls, the second connector includes: a second housing having the leading end, and both outer walls facing the both sidewalls defining the receiving space; a held portion held by the holding portion of the first connector at the waiting position; and an engagement portion being engaged with the stopper of the first connector, and at the waiting position, the first connector and the second connector are movable between positions in a wall contact state, at which the leading end of the second connector is in contact with the wall defining the receiving space of the first connector, and positions in a stopped state, at which the stopper of the first connector and the engagement portion of the second connector are in contact with each other.

In addition, in the connector according to the present invention, the first connector includes a plurality of contacted parts arranged at predetermined intervals on the wall defining the receiving space, the contacted parts each having flat contacted faces formed on both surfaces of a flat plate shape, the second connector includes: a plurality of contacted part insertion grooves formed at the leading end side of the second housing at the same intervals as arrangement intervals of the contacted parts; and a plurality of contacting parts being respectively disposed in the contacted part insertion grooves, the contacting parts having contacting portions to be in contact with the flat contacted faces of the contacted parts, and in a fitted state in which the second connector is fitted to the first connector, the contacting parts and the contacted parts are in contact with each other when the positions of the first connector and the second connector are between the positions in the wall contact state and the positions in the stopped state.

In addition, in the connector according to the present invention, the first connector includes a maintaining portion preventing the second connector from being detached from the first connector upward in the fitted state, the second connector includes an abutting portion being in contact with the fitting portion, and in the fitted state, the contacting parts and the contacted parts are in contact with each other when the positions of the first connector and the second connector are between positions in a state in which a lower face of the second connector is in contact with the base defining the receiving space of the first connector and positions in a state in which the maintaining portion and the abutting portion are in contact with each other.

In addition, a connector mounting board according to the present invention is a connector mounting board having a plate-like shape, and including at least one of the first connector and the second connector, wherein the connector mounting board has a shape extending in a board longitudinal direction, and has a through-hole into which a protrusion, formed on an attachment member to which the connector mounting board is attached, is inserted.

In addition, in the connector mounting board according to the present invention, at the waiting position, the protrusion is inserted into the through-hole when relative positions of the first connector and the second connector are any positions between positions in the wall contact state and positions in the stopped state.

In addition, in the connector mounting board according to the present invention, LEDs are mounted on the connector mounting board.

In addition, in the connector mounting board according to the present invention, the first connector and the second connector are mounted on the connector mounting board, and a plurality of connector mounting boards of the same structure as the connector mounting board are coupled to one another in the board longitudinal direction by repeating: fitting the second connector mounted on a connector mounting board to be newly attached to the attachment member to the first connector mounted on a connector mounting board attached to the attachment member, and fitting the second connector mounted on a connector mounting board to be further newly attached to the attachment member to the first connector mounted on the connector mounting board newly attached to the attachment member.

In addition, an illumination device according to the present invention includes: the connector mounting board according to the present invention; and the attachment member to which the connector mounting board is attached.

In addition, a display device according to the present invention includes: the illumination device according to claim 8; and a liquid crystal panel whose back face faces the illumination device.

Advantageous Effects of Invention

The present invention facilitates connection of boards with each other in the process of manufacture of an LED backlight.

DESCRIPTION OF EMBODIMENTS

Figure 1:
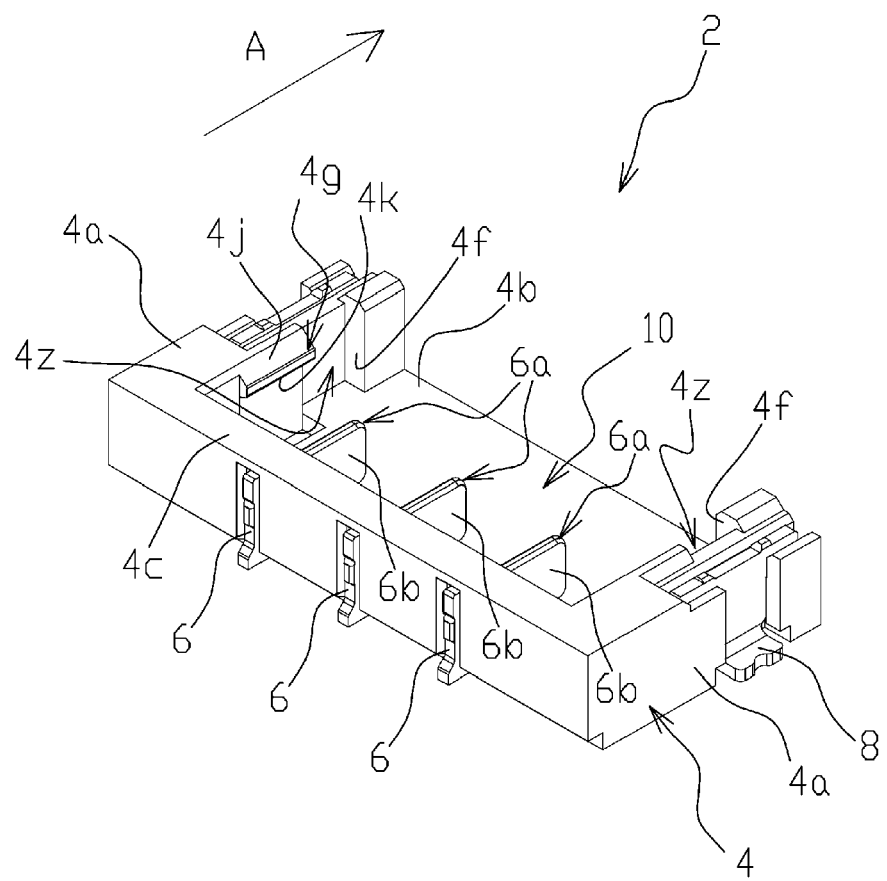
FIG. 1 is a perspective view of a front face of a plug connector according to an embodiment.
Figure 2:
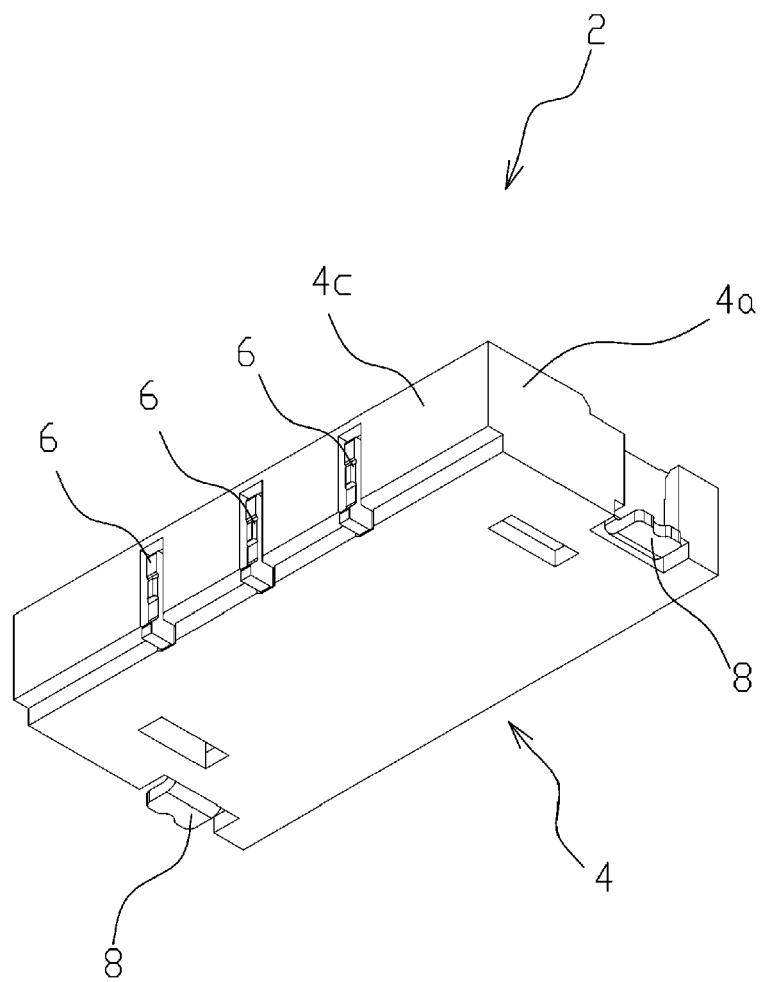
FIG. 2 is a perspective view of a rear face of the plug connector according to the embodiment.

A connector according to an embodiment of the present invention will now be described with reference to the drawings. FIG. 1 is a perspective view of a front face of a plug connector according to the embodiment, and FIG. 2 is a perspective view of a rear face of the plug connector according to the embodiment. In addition, FIG. 3 is a plan view of the front face of the plug connector according to the embodiment.

Figure 3:
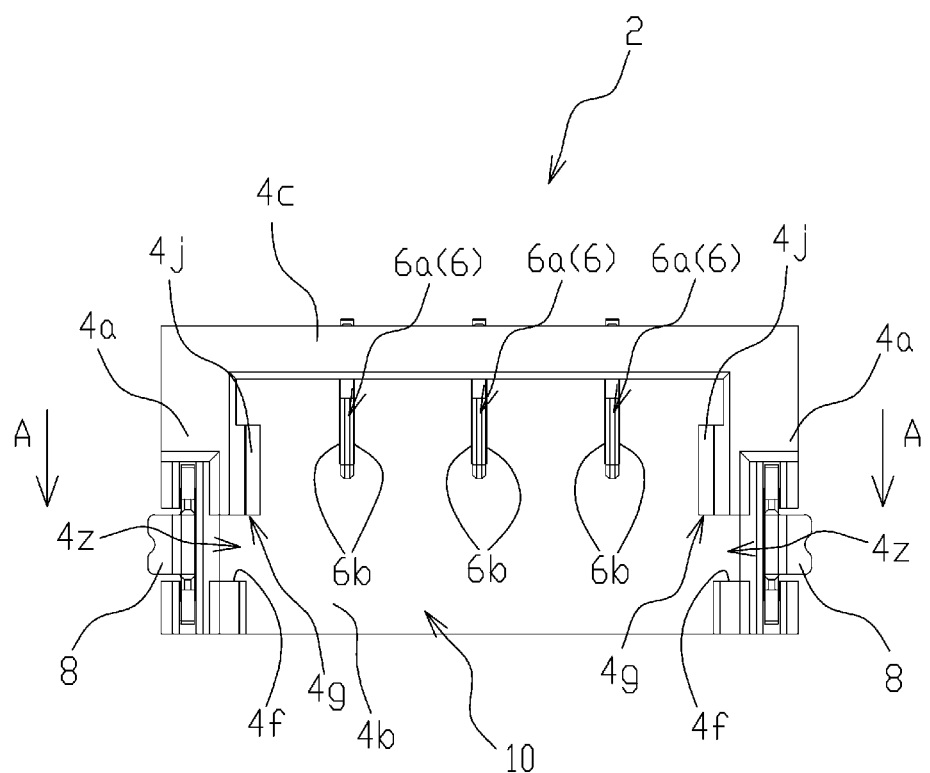
FIG. 3 is a plan view of the front face of the plug connector according to the embodiment.

As illustrated in FIGS. 1 to 3, the plug connector 2 includes a first housing 4 having a rectangular shape in plan view, first contacts 6, and first fixing fittings 8.

Figure 4:
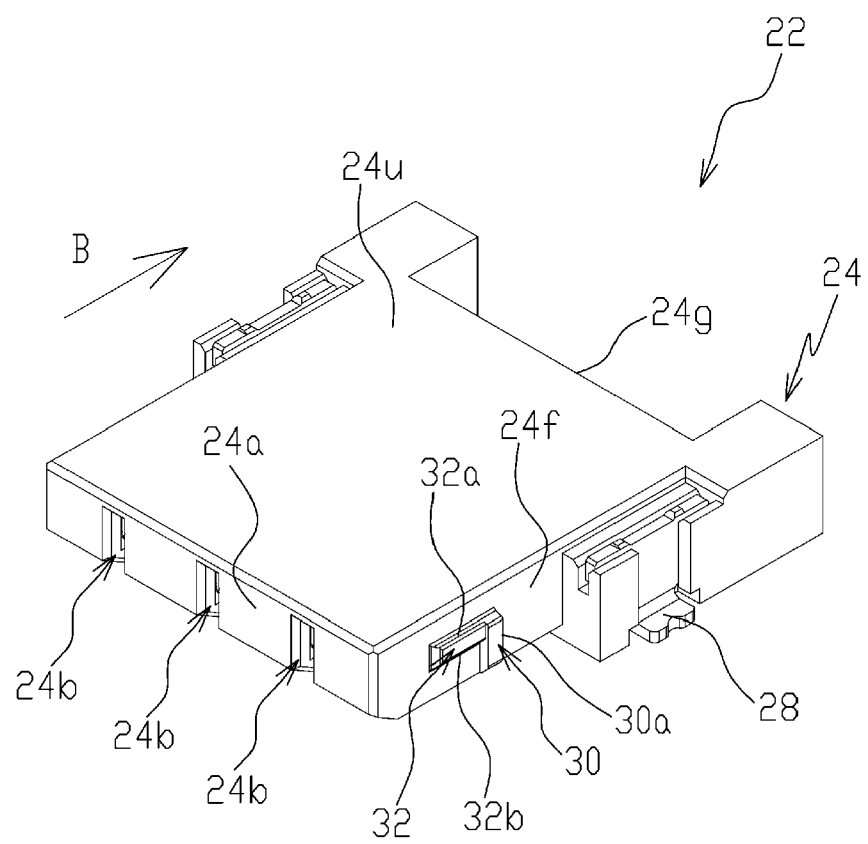
FIG. 4 is a perspective view of a front face of a receptacle connector according to the embodiment.

The first housing 4 is made of an insulating member, and has a receiving space 10 formed in the central region to receive a receptacle connector 22 (see FIG. 4). The receiving space 10 is a space having a rectangular parallelepiped shape surrounded by sidewalls 4a formed on respective ends in the longitudinal direction of the first housing 4, a base 4b, and a wall 4c facing a leading end 24a of the receptacle connector 22 (see FIG. 4).

Note that a cutout 4z is formed by cutting out each of the sidewalls 4a, which define the receiving space 10, into a rectangular parallelepiped shape at substantially the center in a longitudinal direction A of the sidewalls 4a. A stopper 4f for preventing the receptacle connector 22 from being detached from the plug connector 2 in a longitudinal direction A of the sidewalls 4a is formed at a face that is the farthest from the wall 4c of three faces defining each of the cutouts 4z.

Figure 12:
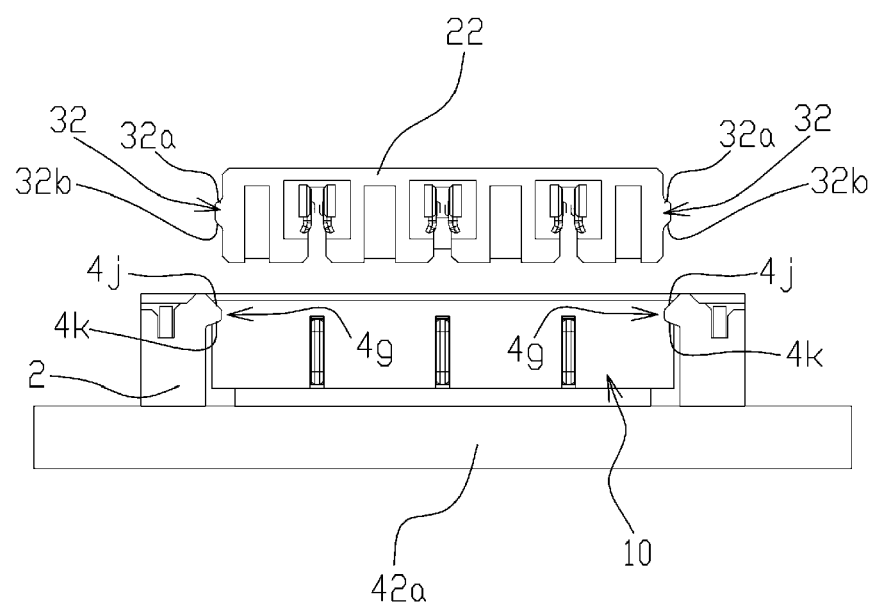
FIG. 12 is a cross-sectional view of the plug connector and the receptacle connector according to the embodiment positioned in the initial state.

A protrusion 4g having a substantially rectangular parallelepiped shape, extending in the longitudinal direction A of the sidewalls 4a, and protruding toward the receiving space 10 is formed on an upper end of each of the sidewalls 4a. An upper face of each of the protrusions 4g is formed to be a holding face 4j for holding the receptacle connector 22, which is placed above, at the waiting position, which will be described later. The holding faces 4j are inclined downward from the upper ends of the sidewalls 4a toward the base 4b in the receiving space 10 (see FIG. 12). In addition, a lower face of each of the protrusions 4g is formed to be a fitting maintaining face 4k for preventing the receptacle connector 22 from being detached from the plug connector 2 upward in the fitted state, which will be described later, so that the receptacle connector 22 fitted to the plug connector 2 would not detach upward. The fitting maintaining faces 4k are inclined upward in the receiving space 10 from the sidewalls 4a (see FIG. 12).

The first contacts 6 are conductive metal members arranged at predetermined intervals along the longitudinal direction of the wall 4c of the first housing 4, and each has, on the receiving space 10 side, a flat plate shaped contacted part 6a to be in contact with a contacting part (a spring piece 26a illustrated in FIG. 7) of a second contact 26. Both surfaces of a flat plate shape of each of the contacted parts 6a are formed to be flat contacted faces 6b to be in contact with a contacting portion 26c (see FIG. 7) of a spring piece 26a of a second contact 26, the flat contacted faces 6b being perpendicular to the longitudinal direction of the wall 4c.

The first fixing fittings 8 are fittings for fixing the plug connector 2 onto a connector mounting board 42a (see FIG. 8), and are located on the respective sidewalls 4a of the first housing 4.

Figure 5:
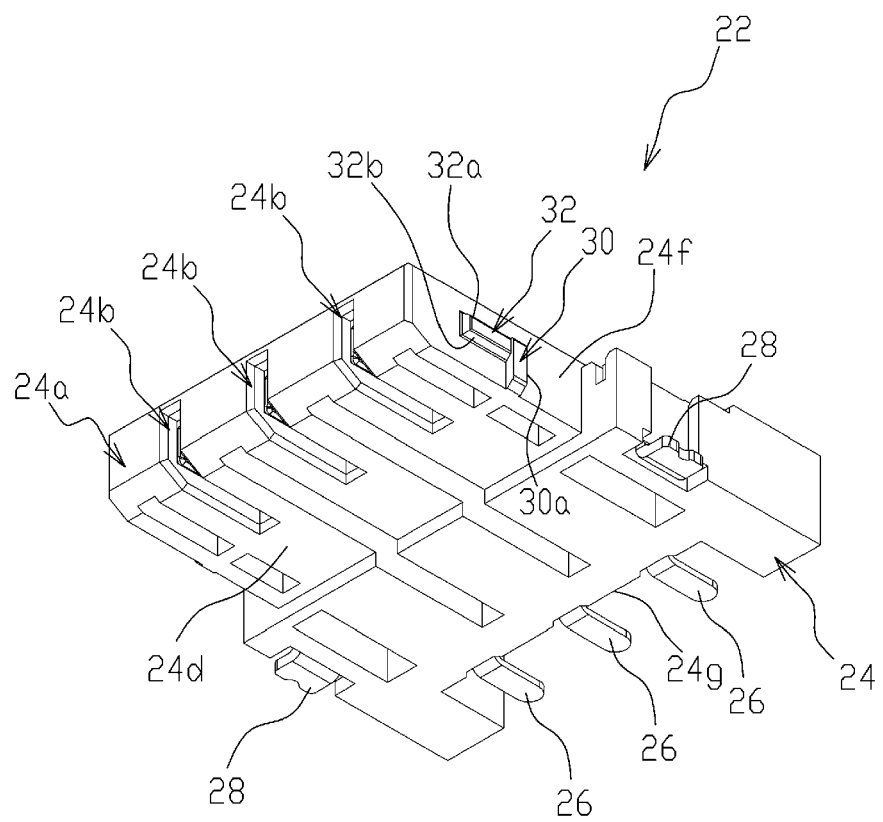
FIG. 5 is a perspective view of a rear face of the receptacle connector according to the embodiment.

FIG. 4 is a perspective view of a front face of the receptacle connector according to the embodiment, and FIG. 5 is a perspective view of a rear face of the receptacle connector according to the embodiment. In addition, FIG. 6 is a plan view of the rear face of the plug connector according to the embodiment.

Figure 6:
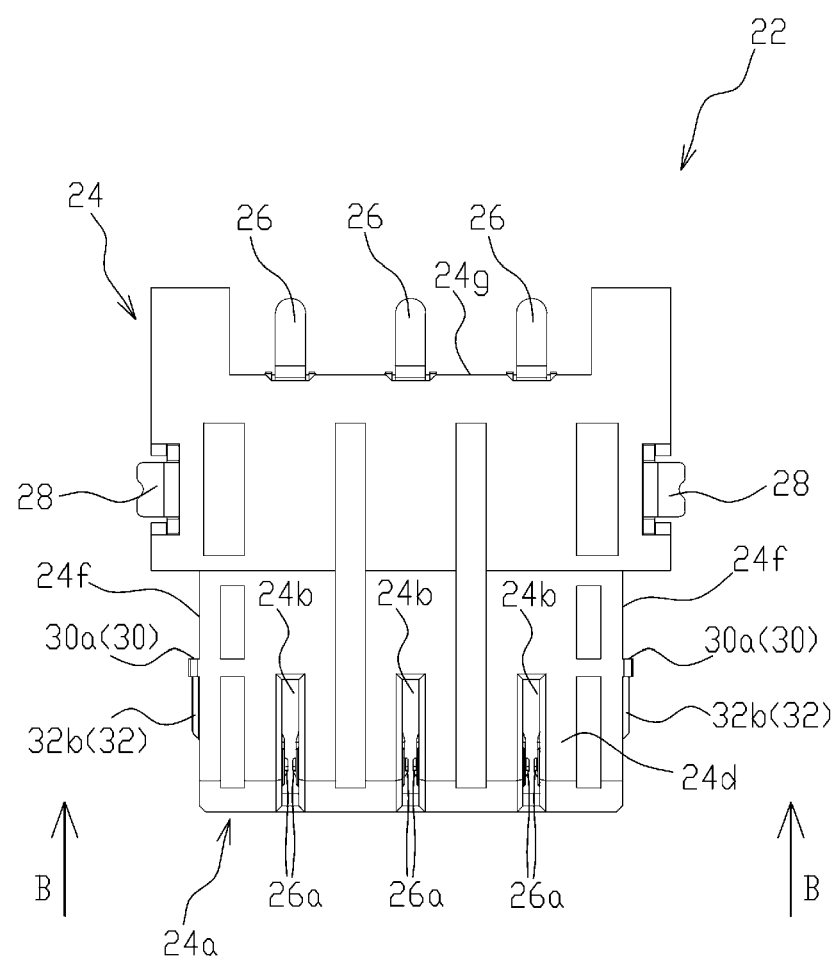
FIG. 6 is a plan view of the rear face of the receptacle connector according to the embodiment.

As illustrated in FIGS. 4 to 6, the receptacle connector 22 includes a second housing 24, second contacts 26, and second fixing fittings 28.

The second housing 24 is made of an insulating member, and has, at the leading end 24a side of the second housing 24, insertion grooves 24b, into which the contacted parts 6a are to be inserted, formed at the same intervals as the arrangement of the first contacts 6 of the plug connector 2. The insertion grooves 24b are formed by cutting out from the leading end 24a to a lower face 24d of the second housing 24. Alternatively, the insertion grooves 24b may be formed by further cutting out from the leading end 24a to an upper face 24u (not illustrated). In this case, the height of the contacted parts 6a may be increased to such an extent that upper ends of the contacted parts 6a inserted in the insertion grooves 24b are at the position of the upper face 24u of the second housing 24 when the receptacle connector 2 is fitted to the plug connector 2.

In addition, first outer wall protrusions 30 having a substantially rectangular parallelepiped shape and extending in the height direction of outer walls 24f at the leading end 24a side of the second housing 24 and second outer wall protrusions 32 having a substantially rectangular parallelepiped shape and extending in a longitudinal direction B of the outer walls 24f are formed on the respective outer walls 24f.

Note that rectangular faces on a rear end 24g side of the first outer wall protrusions 30 are formed to be engagement faces 30a to be engaged with the stoppers 4f of the plug connector 2. In addition, upper faces of the second outer wall protrusions 32 are formed to be abutting faces 32a to be in contact with the fitting maintaining face 4k of the plug connector 2, the abutting faces 32a inclining downward outward of the outer walls 24f. In addition, lower faces of the second outer wall protrusions 32 are formed to be held faces 32b to be in contact with the holding faces 4j of the plug connector 2, the held faces 32b inclining upward outward of the outer walls 24f.

Figure 7:
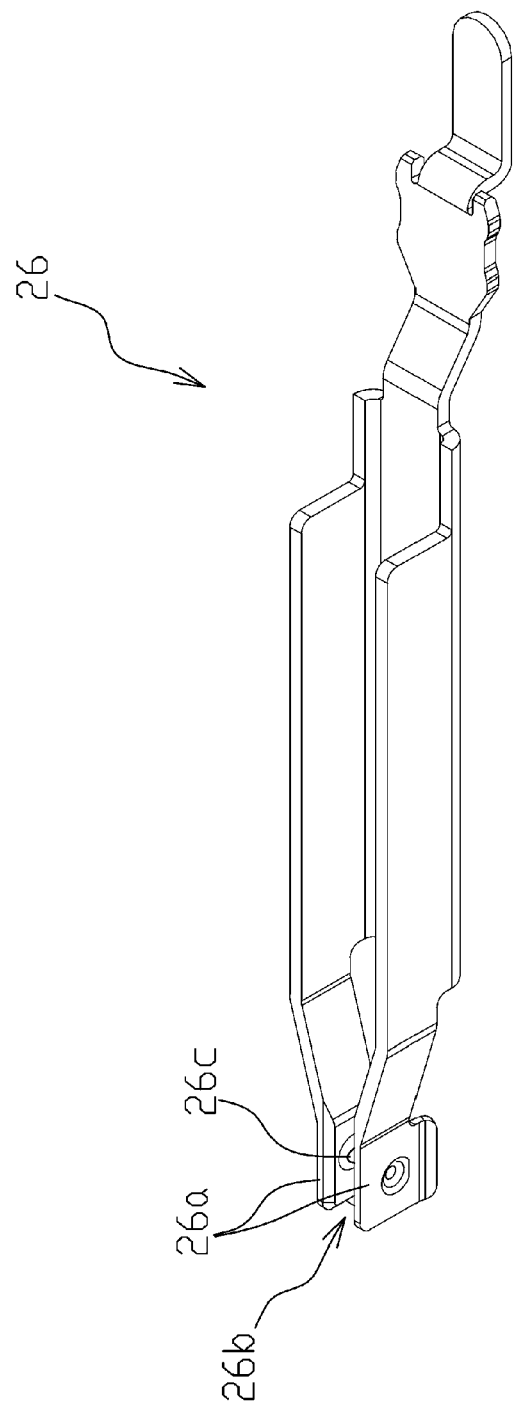
FIG. 7 is a perspective view illustrating a second contact provided on the receptacle connector according to the embodiment.

The second contacts 26 are arranged in the second housing 24 at the same intervals as the arrangement of the first contacts 6. Note that, as illustrated in FIG. 7, a second contact 26 has, on one end, two spring pieces 26a that are contacting parts to be in contact with the contacted part 6a of a first contact 6, the spring pieces 26a being positioned in an insertion groove 24b of the second housing 24. The two spring pieces 26a are provided at positions opposed to each other, and have contacting portions 26c, to be in contact with the flat contacted faces 6b of the contacted part 6a, on faces on the sides of a space 26b between the spring pieces 26a.

Figure 8:
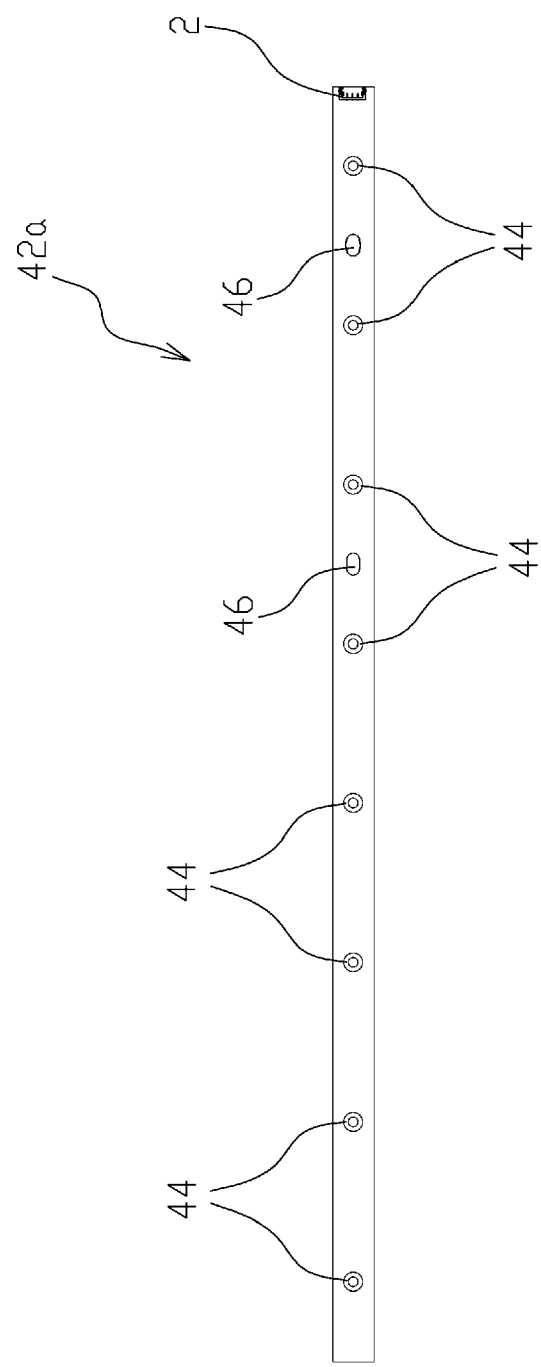
FIG. 8 is a plan view illustrating a connector mounting board for an LED backlight with the plug connector according to the embodiment.
Figure 9:
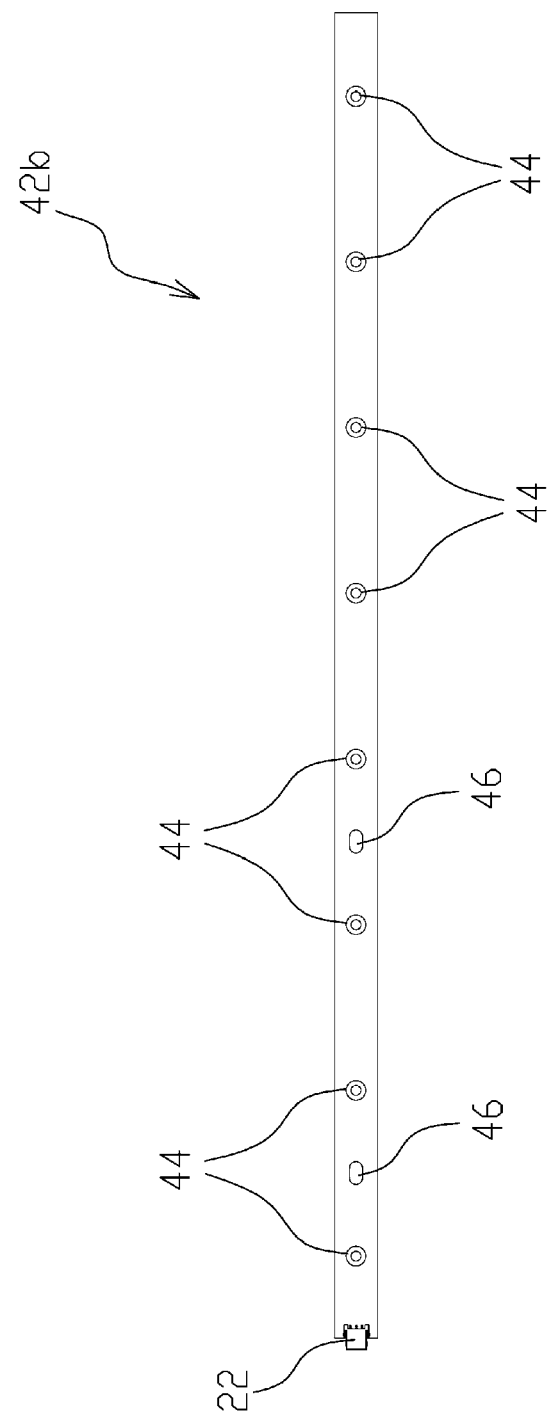
FIG. 9 is a plan view illustrating a connector mounting board for an LED backlight with the receptacle connector according to the embodiment.

FIG. 8 is a plan view illustrating a connector mounting board for an LED backlight with the plug connector 2 according to the embodiment, and FIG. 9 is a plan view illustrating a connector mounting board for an LED backlight with the receptacle connector 22 according to the embodiment. As illustrated in FIGS. 8 and 9, the plug connector 2 is mounted on one end of a connector mounting board 42a, and the receptacle connector 22 to be fitted to the plug connector 2 is mounted on one end of a connector mounting board 42b. In addition, the connector mounting boards 42a and 42b each have a plurality of LEDs 44 mounted thereon and through-holes 46 having a horizontally long shape extending in the longitudinal direction of the boards.

Figure 10:
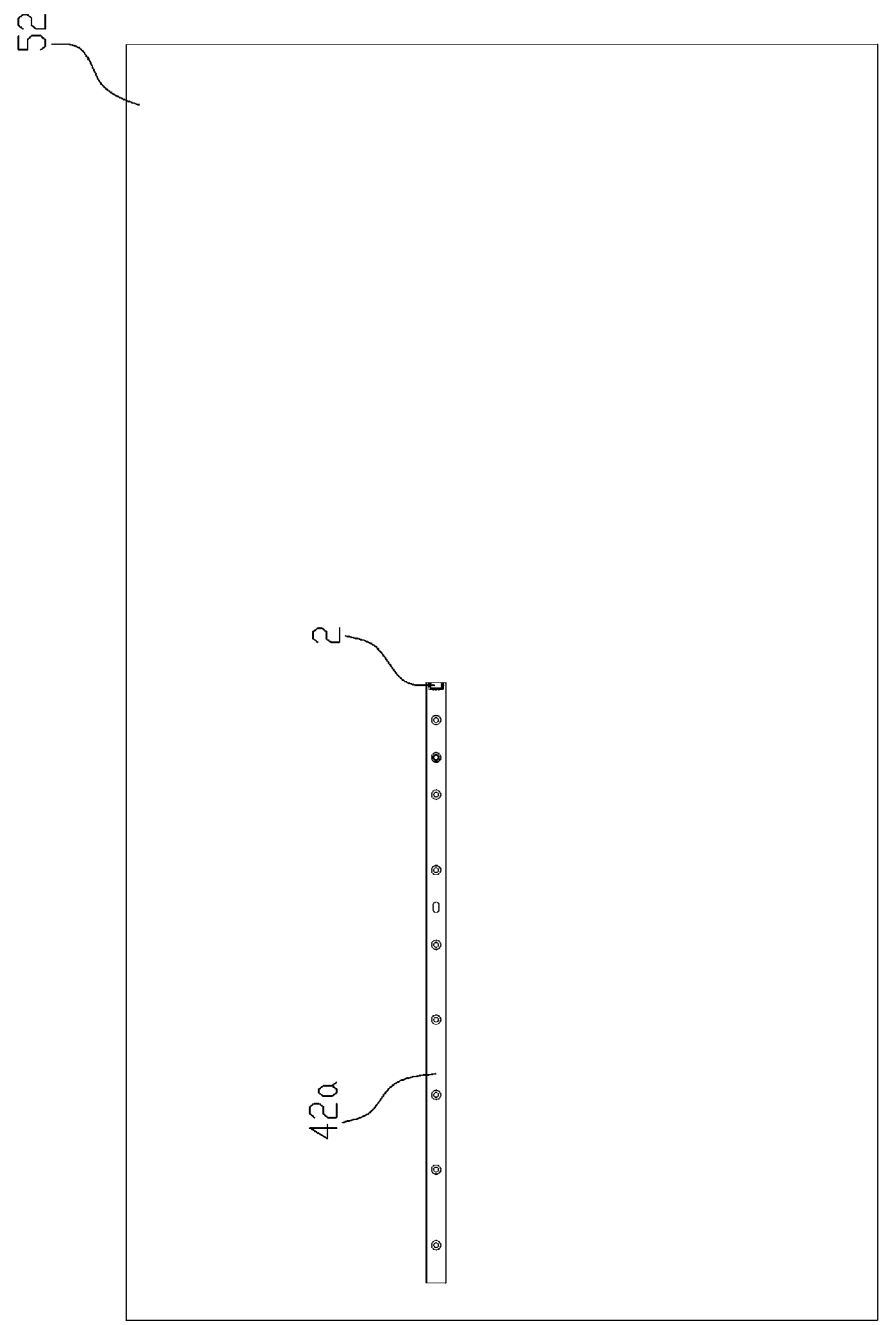
FIG. 10 is a plan view illustrating a state in which a connector mounting board according to the embodiment is attached to a back chassis of an LED backlight.
Figure 11:
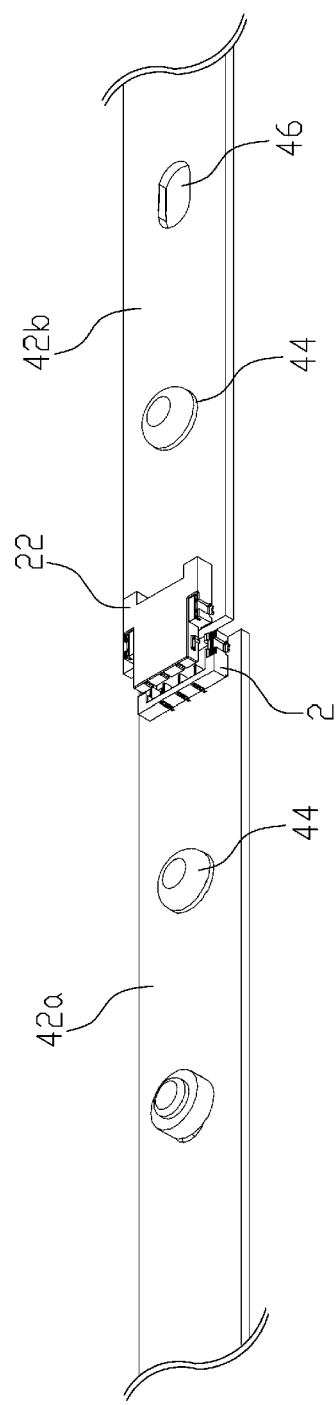
FIG. 11 is a perspective view of the plug connector and the receptacle connector according to the embodiment positioned in an initial state.

Next, procedures for coupling the connector mounting board 42b having the receptacle connector 22 mounted thereon to the connector mounting board 42a having the plug connector 2 mounted thereon will be described. First, as illustrated in FIG. 10, the connector mounting board 42a is attached to a back chassis 52 of an LED backlight. Subsequently, as in a perspective view illustrated in FIG. 11 and a cross-sectional view illustrated in FIG. 12, the position of the receptacle connector 22 mounted on the connector mounting board 42b is brought to a predetermined position above the plug connector 2 mounted on the connector mounting board 42a (this state will hereinafter be referred to as an initial state).

Figure 13:
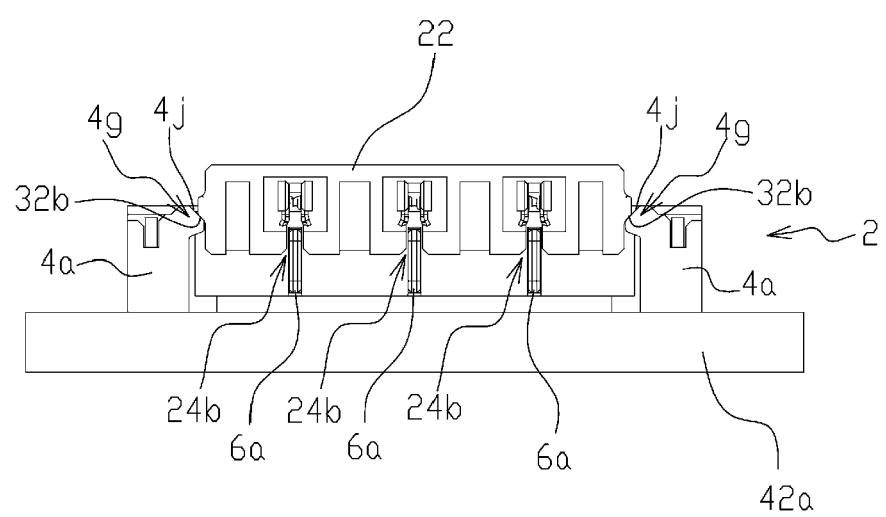
FIG. 13 is a cross-sectional view of the plug connector and the receptacle connector according to the embodiment positioned at the waiting position.

Here, the receptacle connector 22 mounted on the connector mounting board 42b is moved downward, which makes the second housing 24 of the receptacle connector 22 be received in the receiving space 10 of the plug connector 2, and the holding faces 4j that are the upper faces of the protrusions 4g protruding from the sidewalls 4a of the plug connector 2 be brought into contact with the held faces 32b that are the lower faces of the second outer wall protrusions 32 of the receptacle connector 22 as illustrated in FIG. 13. As a result, the position of plug connector 2 is maintained at the waiting position by the holding faces 4j. Note that the waiting position to wait for being fitted to the plug connector 2 is a position of a state in which the positions of the plug connector 2 and the receptacle connector 22 are aligned at positions enabling fitting in a fitting process of fitting the receptacle connector 22 to the plug connector 2.

In addition, at the waiting position, the contacted parts 6a of the first contacts 6 included in the plug connector 2 are inserted in the insertion grooves 24b formed on the second housing 24.

Figure 14:
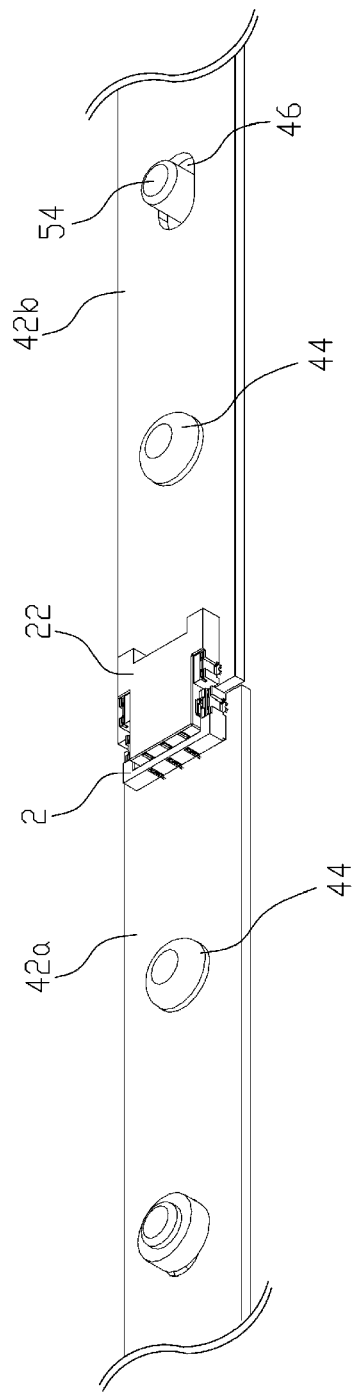
FIG. 14 is a perspective view illustrating the connector mounting board with the plug connector and the connector mounting board with the receptacle connector at the waiting position according to the embodiment.
Figure 15:
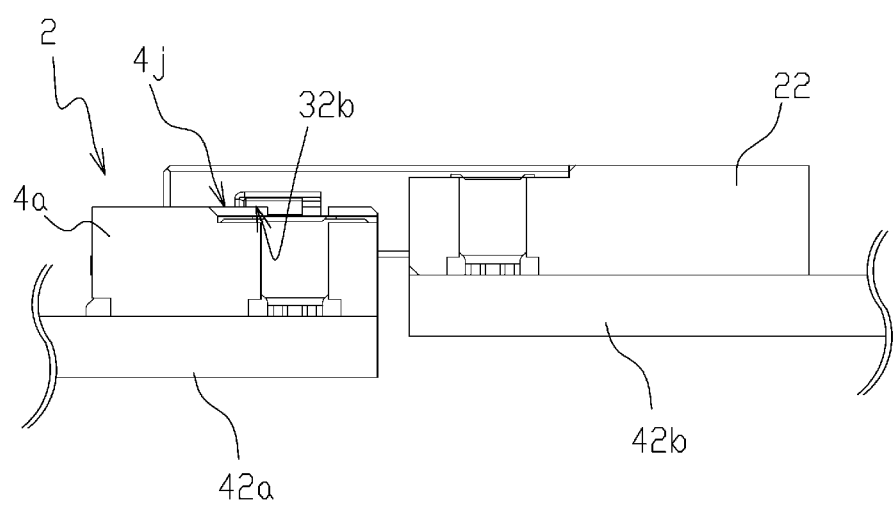
FIG. 15 is a side view of the plug connector and the receptacle connector according to the embodiment positioned at the waiting position.

FIG. 14 is a perspective view illustrating the connector mounting board 42a with the plug connector 2 and the connector mounting board 42b with the receptacle connector 22 at the waiting position, and FIG. 15 is a side view thereof. At the waiting position, the receptacle connector 22 is held by the holding faces 4j in a state in which the receptacle connector 22 is slidable in the longitudinal direction of the boards. Specifically, the receptacle connector 22 held by the holding faces 4j can be slid in the longitudinal direction of the boards from a position in a wall contact state illustrated in FIG. 16, in which the leading end 24a of the receptacle connector 22 is in contact with the wall 4c of the plug connector 2, to the position in a stopped state illustrated in FIG. 17, in which the stoppers 4f (see FIG. 1) of the plug connector 2 and the engagement faces 30a of the receptacle connector 22 are in contact with each other.

Figure 16:
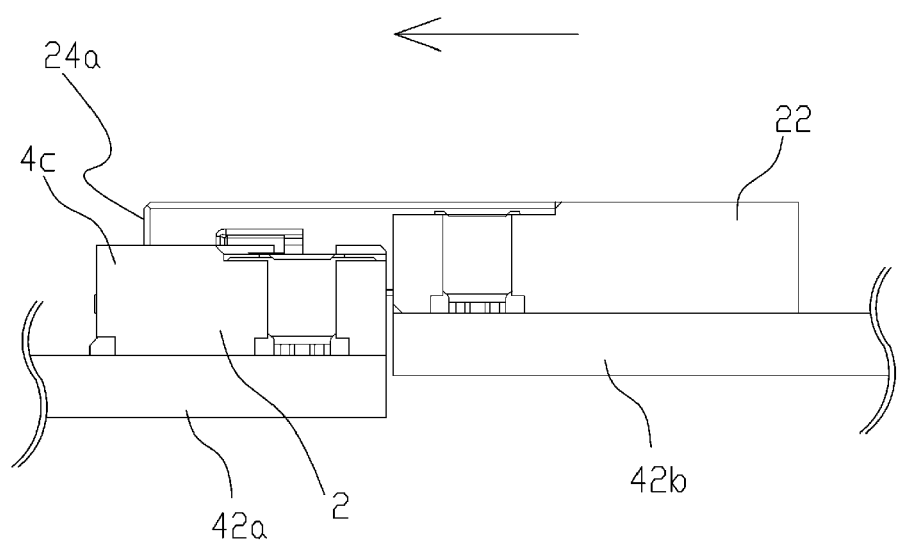
FIG. 16 is a side view illustrating a state in which a leading end of the receptacle connector is in contact with a wall of the plug connector at the waiting position according to the embodiment.
Figure 17:
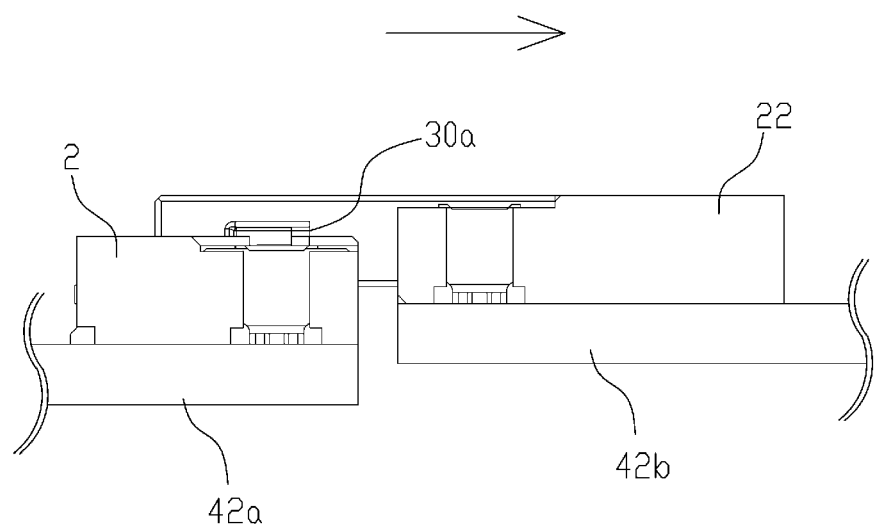
FIG. 17 is a side view illustrating a state in which a stopper of the plug connector and an engagement face of the receptacle connector are in contact with each other at the waiting position according to the embodiment.

Thus, the receptacle connector 22 can be positioned to a position at the waiting position by making the plug connector 2 be in contact with the receptacle connector 22 within the range from the wall contact state illustrated in FIG. 16 to the stopped state illustrated in FIG. 17. This allows an operator to easily complete positioning of the receptacle connector 22 without performing precise positioning. In addition, the connector mounting board 42b is slid in the longitudinal direction of the boards while being maintained at the waiting position, which allows positioning of the through-holes 46 so that positioning protrusions 54 formed on the back chassis 52 are at the positions of the through-holes 46 and allows the positioning protrusions 54 to be accurately inserted in the through-holes 46 as illustrated in FIG. 14. Note that, when the positioning protrusions 54 are inserted in the through-holes 46, the position of the connector mounting board 42b on the back chassis 52 is fixed in the thickness direction and in the longitudinal direction of the boards.

Figure 18:
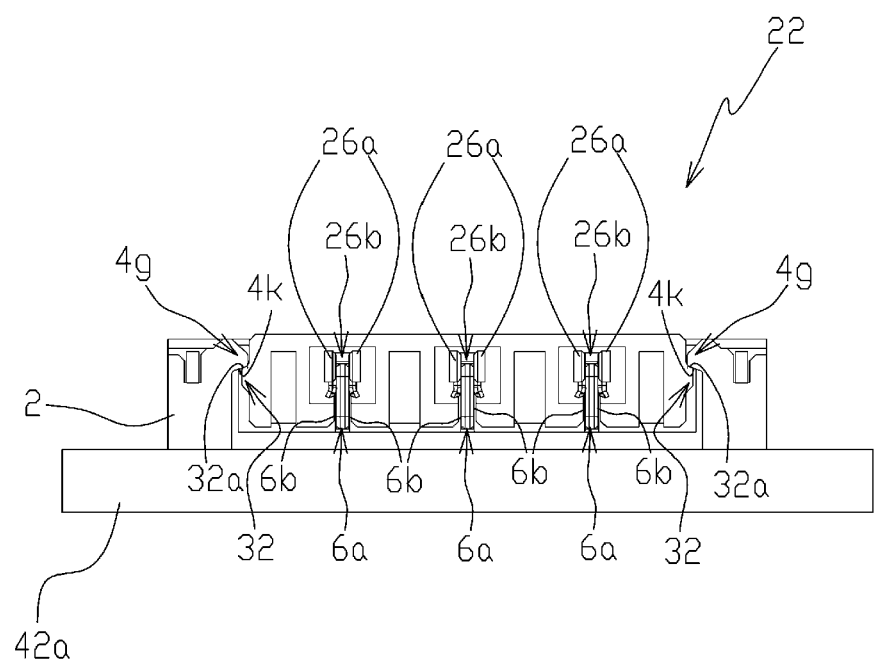
FIG. 18 is a cross-sectional view of the plug connector and the receptacle connector according to the embodiment positioned in a fitted state.

Subsequently, the receptacle connector 22 is pressed further downward, the second outer wall protrusions 32 of the receptacle connector 22 are thus moved to below the protrusions 4g of the plug connector 2, the receptacle connector 22 is locked by the protrusions 4g so as not to detach upward, and the receptacle connector 22 is fitted to the plug connector 2 (hereinafter referred to as the fitted state) as illustrated in FIG. 18.

In addition, the contacted parts 6a of the first contacts 6 (see FIG. 1) are inserted into the spaces 26b between the spring pieces 26a formed at the ends of the second contacts 26 (see FIG. 7) arranged on the receptacle connector 22, and the flat contacted faces 6b formed on the both surfaces of the flat plate shaped contacted parts 6a are brought into contact with the contacting portions 26c (see FIG. 7) formed on the spring pieces 26a, which electrically connects the first contacts 6 with the second contacts 26.

Figure 19:
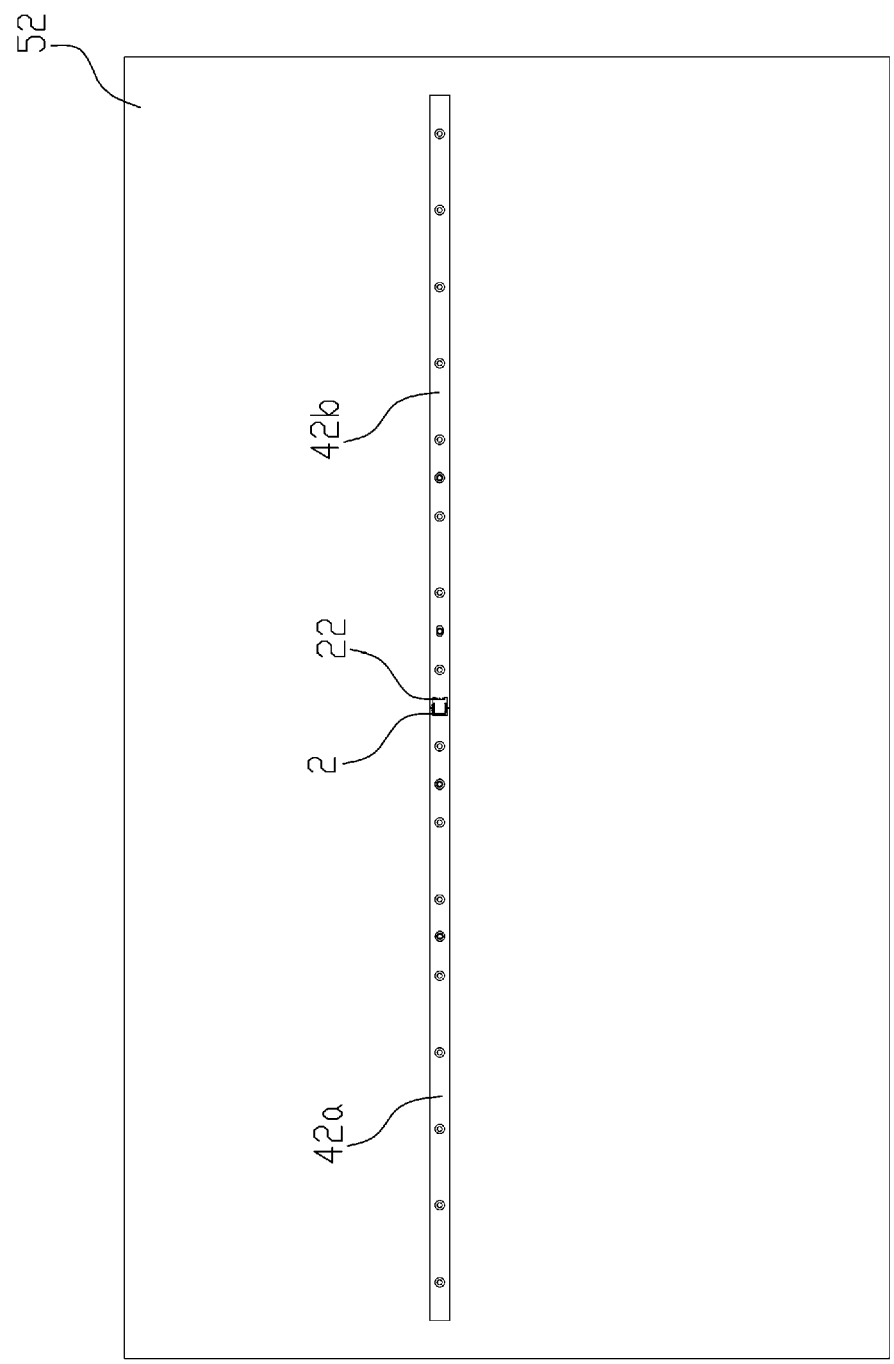
FIG. 19 is a plan view illustrating a state in which a connector mounting board according to the embodiment is attached to a back chassis of an LED backlight.

In the fitted state, nuts are placed on ends of the positioning protrusions 54 inserted in the through-holes 46 of the connector mounting board 42b (see FIG. 14), and the connector mounting board 42b is fixed to the back chassis 52 as illustrated in FIG. 19. Thus, the connector mounting board 42a and the connector mounting board 42b in a state being coupled to each other are attached to the back chassis 52, and an illumination device (LED backlight) is thus produced. Furthermore, the illumination device (LED backlight) on which the connector mounting boards are mounted faces a back face of a liquid crystal panel, and a display device which includes the illumination device (LED backlight) is thus produced.

Note that examples of the display device include devices including a liquid crystal panel, such as a liquid crystal television and a book-size personal computer. In this case, the illumination device (LED backlight) is capable of display video on a liquid crystal panel of a liquid crystal television, a book-size personal computer, or the like by emitting LED light from the back onto the liquid crystal panel.

Figure 20:
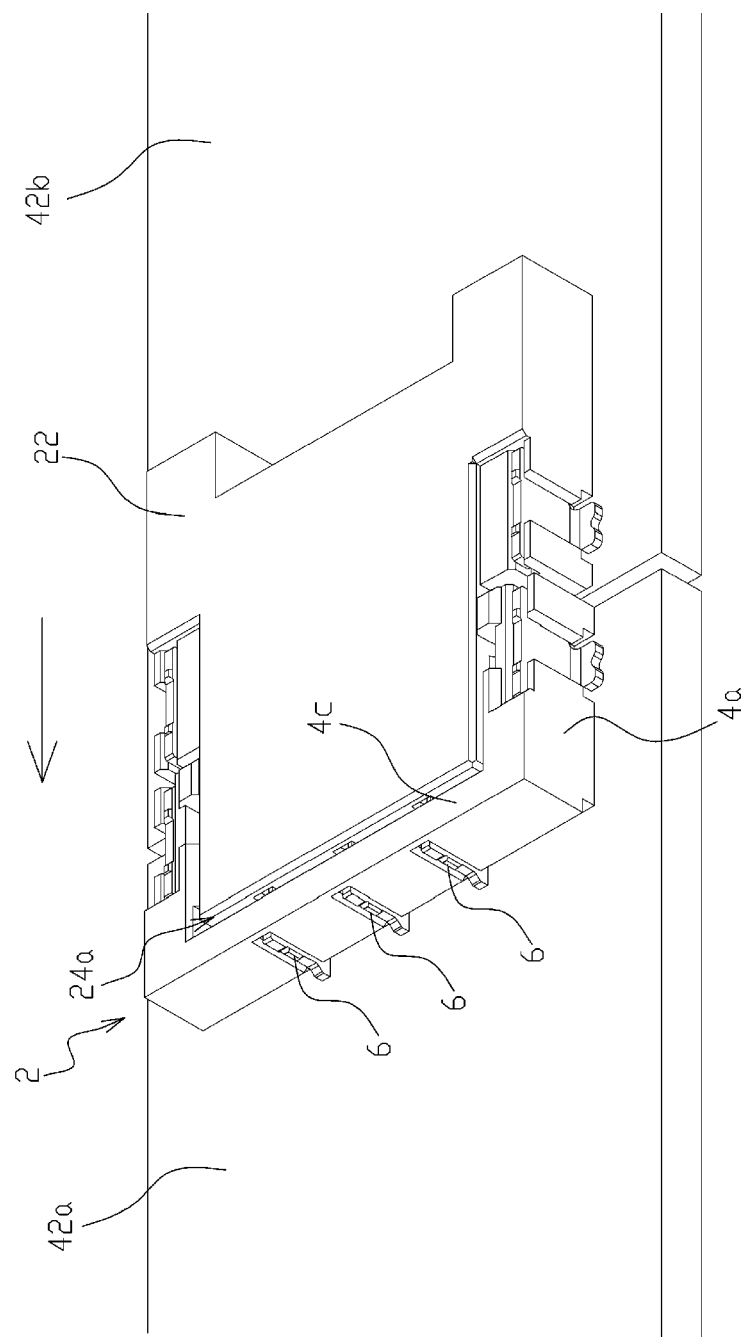
FIG. 20 is a side view illustrating a state in which the leading end of the receptacle connector is in contact with the wall of the plug connector in the fitted state according to the embodiment.
Figure 21:
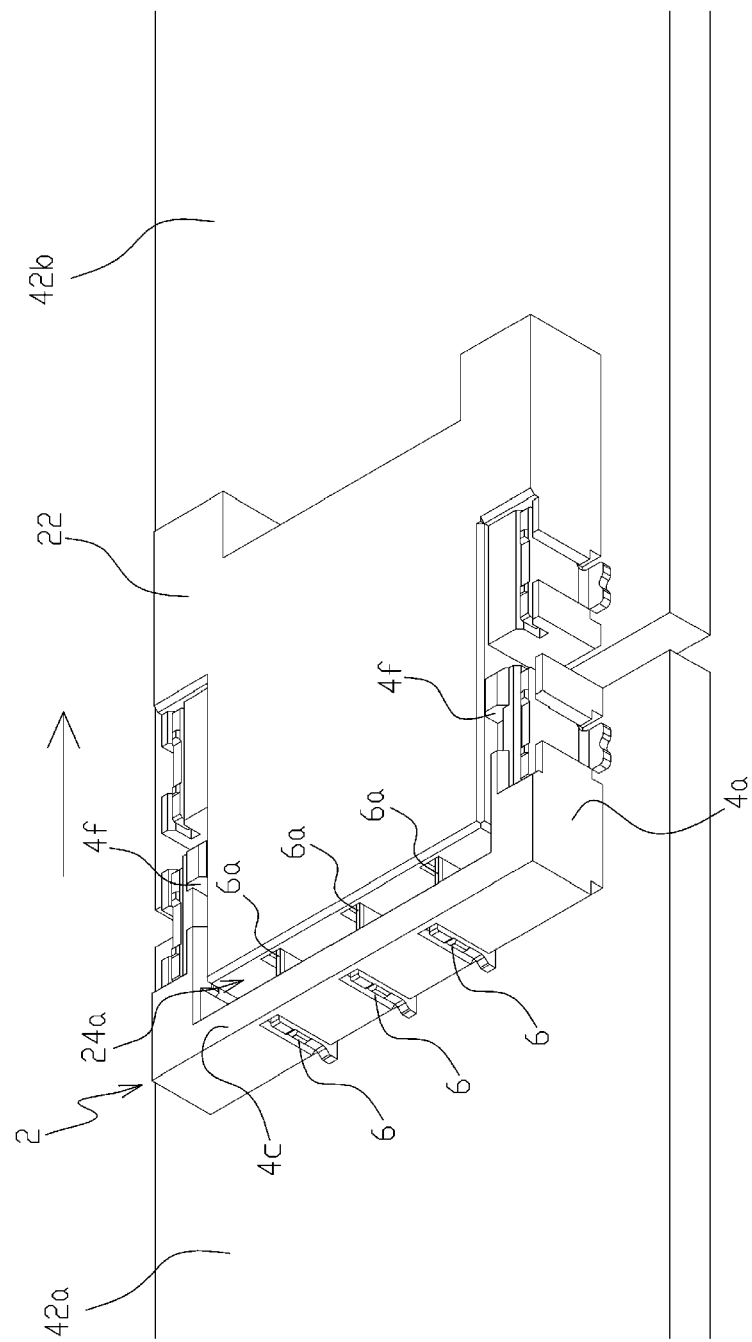
FIG. 21 is a side view illustrating a state in which the stopper of the plug connector and the engagement face of the receptacle connector are in contact with each other in the fitted state according to the embodiment.

Note that, in the fitted state, the contacted parts 6a of the plug connector 2 and the spring pieces 26a that are contacting parts of the receptacle connector 22 are in contact with each other when the positions of the plug connector 2 and the receptacle connector 22 are within a range from the wall contact state illustrated in FIG. 20, in which the leading end 24a of the receptacle connector 22 are in contact with the wall 4c of plug connector 2, to the stopped state illustrated in FIG. 21, in which the stopper 4f formed on the sidewalls 4a of the plug connector 2 and the engagement faces 30a formed on the first outer wall protrusions 30 of the receptacle connector 22 (see FIG. 4) are in contact with each other.

Since the contacted parts 6a and the contacting parts (spring pieces 26a) in the fitted state are in contact with each other within the range from the wall contact state illustrated in FIG. 20 to the stopped state illustrated in FIG. 21 in the longitudinal direction of the boards as described above, the contact state between the contacted parts and the contacting parts can be maintained even when the connector mounting boards 42a and 42b are expanded or contracted depending on an increase or a decrease in heat radiated by the LEDs 44.

In addition, in a case where the connector mounting boards 42a and 42b are expanded by heat, the leading ends 24a of the receptacle connector 22 hit the wall 4c of the plug connector 2, which prevents the connector mounting boards 42a and 42b from being distorted.

Figure 22:
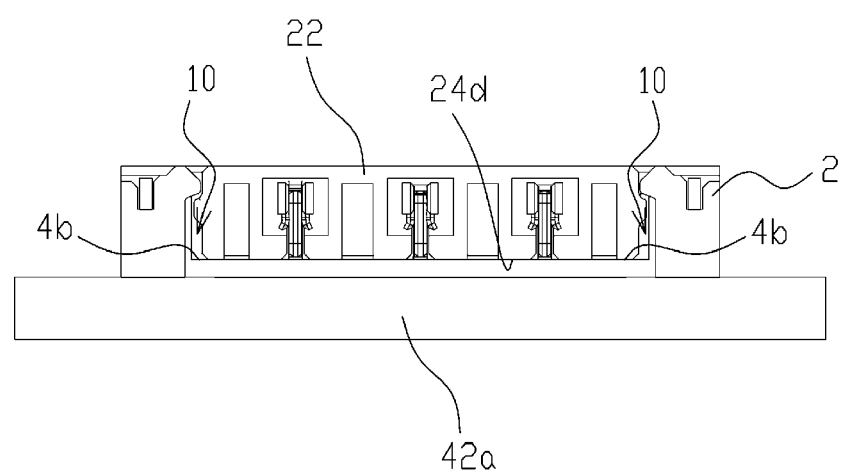
FIG. 22 is a cross-sectional view illustrating a state in which a lower face of the receptacle connector is brought into contact with a base of a receiving space of the plug connector in the fitted state according to the embodiment.

In addition, in the fitted state, the contacted parts 6a and the contacting parts (spring pieces 26a) are in contact with each other within a range between a state illustrated in FIG. 22, in which the positions of the plug connector 2 and the receptacle connector 22 are such that the lower face 24d of the receptacle connector 22 is in contact with the base 4b of the receiving space 10 of the plug connector 2, and a state illustrated in FIG. 18, in which the fitting maintaining faces 4k formed on the protrusions 4g of the plug connector 2 are engaged with the abutting faces 32a formed on the second outer wall protrusions 32 of the receptacle connector 22. As a result, the connector mounting boards 42a and 42b can be slid in the vertical direction while the contact state of the contacted parts and the contacting parts is maintained.

The invention according to the embodiment provides a connector capable of facilitating connection of boards in the process of manufacture of an LED backlight, and a connector mounting board.

Note that the length of the through-holes 46 (see FIGS. 8 and 9) in the longitudinal direction of the boards is such a length that the positioning protrusions 54 are inserted in the through-holes 46 when relative positions of the plug connector 2 and the receptacle connector 22 at the waiting position are positions within a range from the wall contact state illustrated in FIG. 16 to the stopped state illustrated in FIG. 17.

For example, at the waiting position, the length of the through-holes 46 in the longitudinal direction of the boards may be set so that right ends (in the drawing) of the through-holes 46 in FIG. 14 are in contact with the positioning protrusions 54 when the receptacle connector 22 is positioned to the position in the wall contact state (see FIG. 16) and that left ends (in the drawing) of the through-holes 46 in FIG. 14 are in contact with the positioning protrusions 54 when the receptacle connector 22 is positioned to the position in the stopped state (see FIG. 17).

Alternatively, at the waiting position, the length of the through-holes 46 in the longitudinal direction of the boards may be set to be longer so that the through-holes 46 would not be in contact with the positioning protrusions 54 when the receptacle connector 22 is positioned to at least one of the position in the wall contact state (see FIG. 16) and the position in the stopped state (see FIG. 17).

Furthermore, at the waiting position, the length of the through-holes 46 in the longitudinal direction of the boards may be set so that the positioning protrusions 54 cannot be inserted in the through-holes 46 when the receptacle connector 22 is positioned near the position in the wall contact state or near the position in the stopped state.

Figure 23:
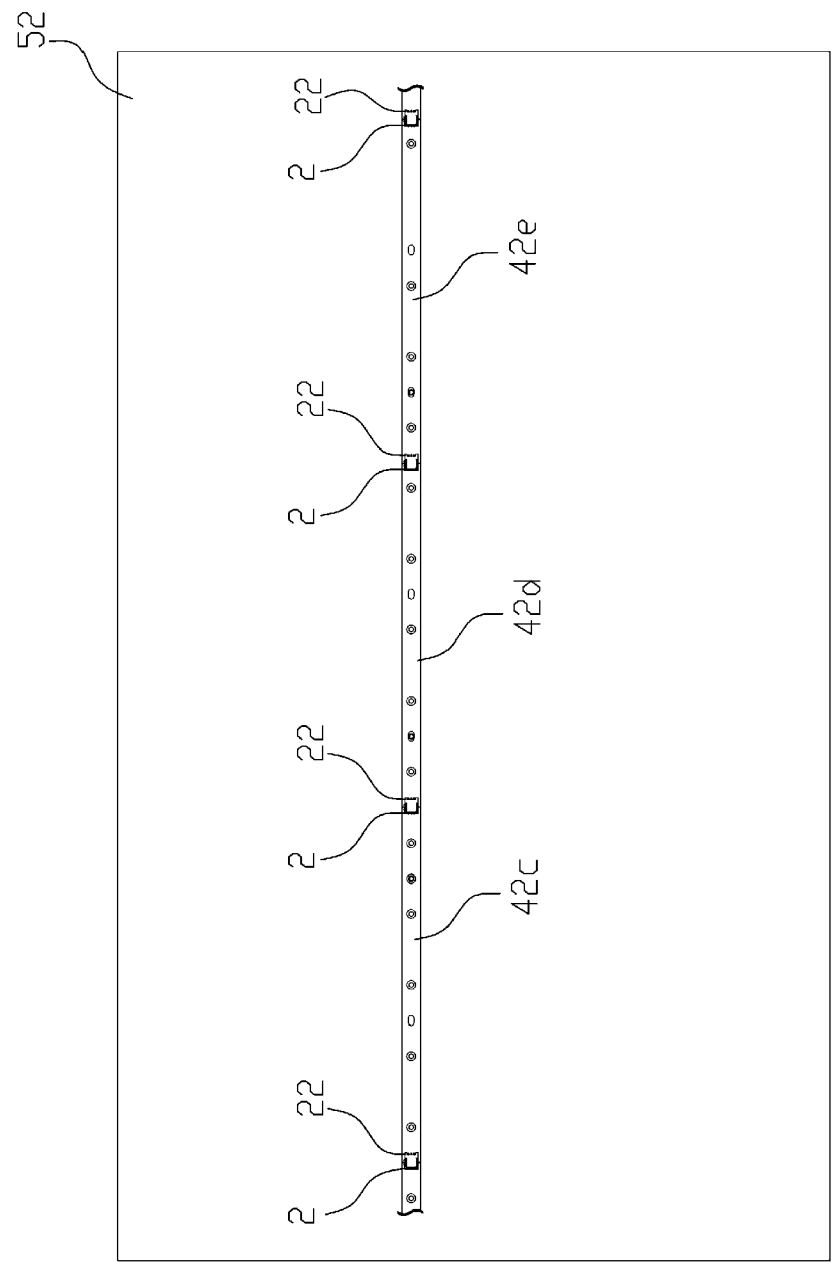
FIG. 23 illustrates a case in which a plurality of connector mounting boards having the plug connectors and the receptacle connectors according to the embodiment are coupled to one another.
Figure 24:
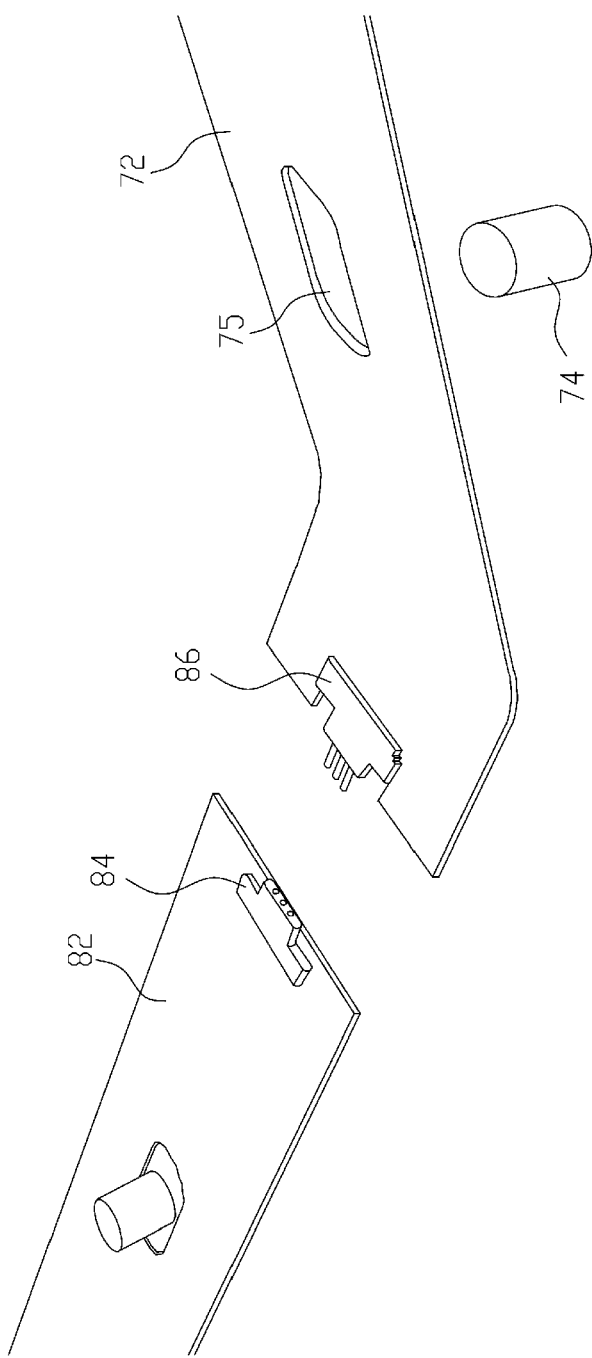
FIG. 24 illustrates a case in which connector mounting boards of the related art are attached to a back chassis of an LED backlight.

In addition, in the embodiment described above, the plug connector 2 may be mounted on one end of a connector mounting board and the receptacle connector 22 may be mounted on the other end thereof. In this case, as illustrated in FIG. 23, fitting the receptacle connector 22 mounted on the connector mounting board 42d to the plug connector 2 mounted on the connector mounting board 42c attached to the back chassis 52, attaching the connector mounting board 42d onto the back chassis 52, further, fitting the receptacle connector 22 mounted on the connector mounting board 42e to the plug connector 2 mounted on the connector mounting board 42d attached to the back chassis 52, and attaching the connector mounting board 42e onto the back chassis 52 are repeated. As a result, a plurality of connector mounting boards can be coupled to one another in the longitudinal direction of the boards.

In addition, while an example of a case in which the stoppers 4f and the protrusions 4g are formed on the sidewalls 4a defining the receiving space 10 is described in the embodiment above, the stoppers 4f and the protrusions 4g need not necessarily be formed on the sidewalls 4a. In addition, the shapes of the stoppers 4f and the protrusions 4g are not necessarily limited to those illustrated in FIGS. 1 and 3.

In addition, in the embodiment described above, the first outer wall protrusions 30 and the second outer wall protrusions 32 need not necessarily be formed on the respective outer walls 24f at the leading end 24a side of the second housing 24. Furthermore, the shapes of the first outer wall protrusions 30 and the second outer wall protrusions 32 are not limited to those illustrated in FIGS. 4 to 6.

The invention claimed is:

1. A connector comprising:
a first connector, and
a second connector to be connected with the first connector, wherein:
the first connector includes:
    a first housing having a receiving space defined by both sidewalls, a base and a wall, the receiving space receiving the second connector to be fitted to the first connector from above the base;
    a holding portion holding the second connector placed above at a waiting position to wait for being fitted to the first connector; and
    a stopper preventing the second connector from being detached from the first connector in a longitudinal direction of the both sidewalls,
the second connector includes:
    a second housing having a leading end facing the wall of the first connector, and both outer walls facing the both sidewalls of the first connector;
    a held portion held by the holding portion of the first connector at the waiting position; and
    an engagement portion being engaged with the stopper of the first connector, and
in a state that the holding portion of the first connector holds the held portion of the second connector at the waiting position, at least one of the first connector and the second connector are movable between a contacting position at which the leading end of the second connector is in contact with the wall of the first connector and an engaging position at which the engagement portion of the second connector is in contact with the stopper of the first connector.

2. The connector according to claim 1, wherein
the first connector includes a plurality of contacted parts arranged at predetermined intervals on the wall,
the second connector includes:
    a plurality of contacted part insertion grooves formed at the leading end part of the second housing at the same intervals as arrangement intervals of the contacted parts; and
    a plurality of contacting parts being respectively disposed in the contacted part insertion grooves,
each of the contacted parts being flat plate shaped and having two flat contacted faces being in contact with each of the contacting parts,
one of the flat contacted faces formed on a first surface of the contacted part and the other of the flat contacted faces formed on a second surface of the contacted part, the second surface being a back surface of the first surface, each of the contacting parts having a contacting portion to be contact with the contacted face of the contacted part, and the contacting parts and the contacted parts are in contact with each other when the first connector and the second connector fit each other between the contacting position and the engaging position.

3. The connector according to claim 2, wherein the first connector includes a maintaining portion preventing the second connector from being detached from the first connector upward a fitted state that the second connector is fitted to the first connector, the second connector includes an abutting portion being in contact with the maintaining portion of the first connector, in the fitted state, the first connector and the second connector fit each other between a first contacting position at which a lower face of the second connector is in contact with the base of the first connector and a second contacting position at which the abutting portion of the second connector is in contact with the maintaining portion of the first connector, and each of the contacting parts and each of the contacted parts are in contact with each other when the first connector and the second connector fit each other between the first contacting portion and the second contacting portion.

4. A connector mounting board having a plate-like shape, comprising at least one of the first connector and the second connector according to claim 1, the connector mounting board further comprising a through-hole having a shape extending in a longitudinal direction of the connector mounting board, wherein a protrusion, formed on an attachment member to which the connector mounting board is attached, is configured to be inserted into the through-hole.

5. The connector mounting board according to claim 4, wherein in the state that the holding portion of the first connector holds the held portion of the second connector at the waiting position, the protrusion is inserted into the through-hole when the first connector and the second connector fit each other between the contacting positon and the engaging position.

6. The connector mounting board according to claim 4, wherein LEDs are mounted on the connector mounting board.

7. The connector mounting board according to claim 4, wherein the connector mounting board includes:

a first connector mounting board on which at least the first connector is mounted, a second connector mounting board on which the first connector and the second connector are mounted, and a third connector mounting board on which at least the second connector is mounted;

the first connector mounted on the first connector mounting board attached to the attachment member is fitted to the second connector mounted on the second connector mounting board, the first connector mounted on the second connector mounting board attached to the attachment member is fitted to the second connector mounted on the third connector mounting board, and the first connector mounting board, the second connector mounting board and the third connector mounting board are coupled to one another in the longitudinal direction of the connector mounting board.

8. An illumination device comprising:

the connector mounting board according to claim 6; and the attachment member to which the connector mounting board is attached.

9. A display device comprising:

the illumination device according to claim 8; and a liquid crystal panel whose back face faces the illumination device.

10. A connector mounting board having a plate-like shape, comprising at least one of the first connector and the second connector according to claim 2, the connector mounting board further comprising a through-hole having a shape extending in a longitudinal direction of the connector mounting board, wherein a protrusion, formed on an attachment member to which the connector mounting board is attached, is configured to be inserted into the through-hole.

11. A connector mounting board having a plate-like shape, comprising at least one of the first connector and the second connector according to claim 3, the connector mounting board further comprising a through-hole having a shape extending in a longitudinal direction of the connector mounting board, wherein a protrusion, formed on an attachment member to which the connector mounting board is attached, is configured to be inserted into the through-hole.

12. The connector mounting board according to claim 5, wherein LEDs are mounted on the connector mounting board.

13. The connector mounting board according to claim 5, wherein the connector mounting board includes:

a first connector mounting board on which at least the first connector is mounted, a second connector mounting board on which the first connector and the second connector are mounted, and a third connector mounting board on which at least the second connector is mounted;

the first connector mounted on the first connector mounting board attached to the attachment member is fitted to the second connector mounted on the second connector mounting board, the first connector mounted on the second connector mounting board attached to the attachment member is fitted to the second connector mounted on the third connector mounting board, and the first connector mounting board, the second connector mounting board and the third connector mounting board are coupled to one another in the longitudinal direction of the connector mounting board.

14. The connector mounting board according to claim 6, wherein the connector mounting board includes:

a first connector mounting board on which at least the first connector is mounted, a second connector mounting board on which the first connector and the second connector are mounted, and a third connector mounting board on which at least the second connector is mounted;

the first connector mounted on the first connector mounting board attached to the attachment member is fitted to the second connector mounted on the second connector mounting board, the first connector mounted on the second connector mounting board attached to the attachment member is fitted to the second connector mounted on the third connector mounting board, and the first connector mounting board, the second connector mounting board and the third connector mounting board are coupled to one another in the longitudinal direction of the connector mounting board.

* * * * *